United States Patent
Rits

(10) Patent No.: US 9,021,550 B2
(45) Date of Patent: Apr. 28, 2015

(54) OPTIMIZATION OF WORKFLOW ACCESS CONTROL

(75) Inventor: Maarten E. Rits, Nice (FR)

(73) Assignee: SAP SE, Walldorf (DE)

(*) Notice: Subject to any disclaimer, the term of this patent is extended or adjusted under 35 U.S.C. 154(b) by 1269 days.

(21) Appl. No.: 11/787,707

(22) Filed: Apr. 16, 2007

(65) Prior Publication Data

US 2008/0016554 A1  Jan. 17, 2008

(30) Foreign Application Priority Data

Jul. 13, 2006  (EP) .................... 06291153

(51) Int. Cl.
*G06F 21/60* (2013.01)
*G06Q 10/06* (2012.01)

(52) U.S. Cl.
CPC .............. *G06F 21/60* (2013.01); *G06Q 10/06* (2013.01)

(58) Field of Classification Search
CPC ............................. G06Q 10/06; G06F 21/60
See application file for complete search history.

(56) References Cited

U.S. PATENT DOCUMENTS

| | | |
|---|---|---|
| 2003/0149714 A1 | 8/2003 | Casati et al. |
| 2004/0039627 A1 | 2/2004 | Palms |
| 2005/0044197 A1* | 2/2005 | Lai ............................... 709/223 |
| 2007/0027881 A1* | 2/2007 | Srivastava ..................... 707/100 |

FOREIGN PATENT DOCUMENTS

EP  1674960  6/2006

OTHER PUBLICATIONS

"Extensible Access Control Markup Language (XACML 2.0)", *ITU-T Stanxard Pre-Published (P), International Telecommunication Union*, Geneva, (Jun. 13, 2006).
"Search Report for European Application No. 06291153".
De Capitani Di Vimercati, S., et al., "Access control: principles and solutions", *Principles and Solutions, Software Practice and Experience*, 33(5), (2003),397-421.

\* cited by examiner

*Primary Examiner* — Gilberto Barron, Jr.
*Assistant Examiner* — Simon Kanaan
(74) *Attorney, Agent, or Firm* — Schwegman Lundberg & Woessner, P.A.

(57) ABSTRACT

A computer-implemented method for executing a workflow is described, wherein the workflow comprises a set of individual activities, the method comprising the operations of deriving a global workflow access type and receiving a request to execute a workflow. Execution of access control based on the global workflow access type is performed. If access is allowable, the user is authorized to execute all activities belonging to the workflow. If access is not allowable, the user is rejected before executing the workflow.

14 Claims, 6 Drawing Sheets

Fig. 3

```
<Policy PolicyId="Policy:7ff2" RuleCombiningAlgId="...rule-combining-algorithm:ordered-permit-overrides">
<Description>PermissionPolicySet</Description>
<Target> ... </Target>
<Rule RuleId="Rule:7ffb" Effect="Permit">
  <Target>
    <Subjects>
      <Subject> Physician </Subject>
    </Subjects>
    <Resources>
      <Resource> MedicalRecords </Resource>
    </Resources>
    <Actions>
      <Action> select </Action>
    </Actions>
  </Target>
</Rule>
</Policy>
```

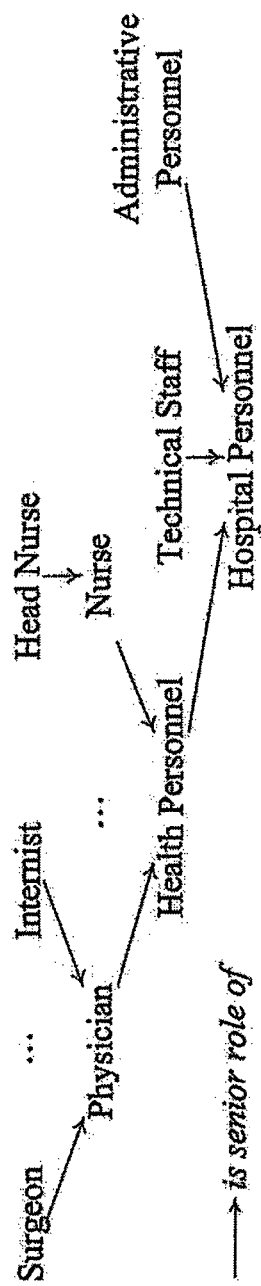

OPTIMIZATION OF WORKFLOW ACCESS CONTROL

CLAIM OF PRIORITY

The present patent application claims the priority benefit of the filing date of European Application (EPO) No. 06291153.2 filed Jul. 13, 2006, the entire content of which is incorporated herein by reference.

TECHNICAL FIELD

This application relates to the field of controlling access to computer applications, in particular to the field of optimising access control for a workflow that is to be executed by one user who is selected beforehand.

TECHNICAL BACKGROUND

Complex composite applications like Web applications, large scale enterprise resource planning systems (ERP) and business processes often require the integration of different enterprise applications.

These enterprise applications usually comprise self-contained sub-applications or sub-activities and are integrated by specifying an overarching workflow, in which these components are used. Typically, a workflow in this case consists of Web services, or, more generally, independent activities or tasks, which are either executed by a user or automatically invoke an external service. The activities may be combined sequentially or alternatively. Sequentially means that all activities will be executed in sequence and alternatively means that the workflow may be split in two or more branches, from which one branch may be chosen during execution, according to a given condition.

Each sub-application, activity or task may enforce its own security policy. Requests resulting from the execution of composite applications might be authorised by some sub-activities but will be rejected by others, depending on the authorisation of a particular user. Workflow executions might be aborted. This may cause transaction rollbacks or compensating actions, often involving a high cost in terms of computing resources or data storage. Unsuccessful executions should therefore be blocked right from the beginning for the sake of efficiency and security.

However, it can be useful to consider a single user scheme separately for example in order to assign the responsibility for a certain task (in terms of work that has to be done) to a trustful employee or to reduce workload on the staff by having one person do the whole workflow.

For the execution of this whole workflow it is necessary that each of the referenced activities performs autonomous access control according to its underlying policies. In order to provide this service by performing an early-filtering of the requests, a consolidated view onto the access control of workflows or general composite applications is needed.

Thereby, two different perspectives onto the security configuration of a composite application can be identified. From the security officer's point of view, access control should be defined as tight as possible to avoid security vulnerabilities. Too restrictive policies on the other hand can hinder legitimate users to execute the application which contradicts the process-centred viewpoint of the application developer.

In this case it would be more efficient to execute the access control only once at the workflow level instead of leaving this task up to each individual Web service. The user may then be authorised to execute all activities belonging to the workflow and no further checking is required. Therefore, a consolidated policy is required that is tailored to the functionality of the composite application.

SHORT DESCRIPTION OF THE FIGURES

Details of example embodiments will become even more apparent when studying the following detailed description, together with the annexed drawings, in which FIG. 1 shows an example of a Web Service workflow in the health sector which may be executed by an example of a method for executing a workflow;

FIG. 3 shows a XACML description of the individual security policy defined for the individual Web Service named 'query medical records';

FIG. 4 shows a limited role hierarchy;

DETAILED DESCRIPTION

Figure 1:
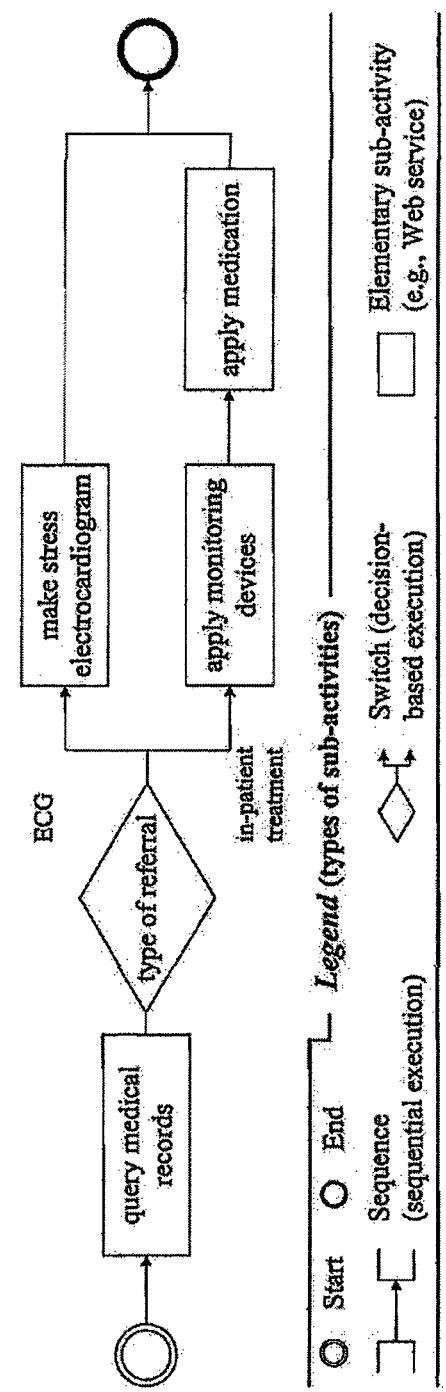

Workflows may comprise the invocation of a plurality of individual activities. These activities or tasks may exist in the form of Web Services, but, more general, they are independent activities, which are either executed by a user or automatically invoke an external service. Each individual activity may specify its own, individual security policy. Individual activities or tasks may be combined cumulatively or alternatively, by using sequence and switch operators.

A method for executing a workflow may comprise the operations of deriving a global workflow access type, receiving a request to execute a workflow and executing the access control based on the global workflow access type. If access is allowable, then the method may authorise the user to execute all activities belonging to the workflow. Otherwise, if access is not allowable, then the method may reject the user before executing the workflow. In the first case, the workflow is executed. Otherwise, the execution of the workflow is omitted.

The consolidation process derives the following information:
1. what are the least required privileges for the execution of the composite application and
2. who is granted these privileges.

The first example aspect meets the security officer's requirements by defining access rules and role profiles that are restricted to the functionality of the composite application.

The second example aspect supports the application developer in detecting unintended configurations. Furthermore, policy consolidation allows detecting unsuccessful execution attempts as users with insufficient privileges can be blocked at an early stage.

In other words, the consolidation process may be advantageous in that it supports the application developer in detecting unintended configurations. Access rights may be computed statically at design time. This not only leads to improved performance but also permits to detect an inescapable execution abortion due to missing privileges at an early stage.

In a further example aspect, deriving a global workflow access type comprises the operations of determining for each individual activity comprised in the workflow the set of individual access rules and inferring a consolidated access control. Specifying access policies by rules carries the advantage that they may easily be combined to form a unified policy for entire sets of individual components. In yet a further example aspect, the individual access rules may be specified in XACML. XACML is a standard access control policy language developed by the OASIS consortium and stands for "extensible Access Control Mark-up Language". XACML enables the use of arbitrary attributes in policies, role-based access control, security labels, time/date-based policies and others, without requiring changes to the applications using XACML.

In another example aspect, the consolidated access control is inferred by intersecting access constraints of individual activities linked in sequence, i.e. which are executed cumulatively. In a further aspect, partial access constraints may be derived for individual branches of a workflow that contains alternative execution paths joined by a switch statement. That is, a partial access constraint would limit a user's access to a particular path in the execution tree, if that user's role only suffices to execute that path.

In a further aspect, the access policy may be based on roles. The roles may be ordered in a limited role hierarchy according to an equal-or-senior relation ($\supseteq$). Access rules may thus be formulated stating a minimal required role for accessing an individual service. Consequently, inferring the consolidated access control may comprise the operation of inferring a minimum role.

Web Service workflows may be specified using BPEL4WS ("Business Process Execution Language for Web Services"). This provides a means to formally specify business processes and interaction protocols to support business transactions (cf. http://www.ibm.com/developerworks/library/specification/ws-bpel/).

In a further aspect, the individual activities of the workflow are combined using control patterns, wherein the control patterns may specify cumulative (SEQUENCE) or alternative (SWITCH) execution of individual activities.

A system for executing a workflow may comprise an access control module, an authorisation module, a decision module, a multitude of individual task or service modules and a workflow execution module.

FIG. 1 shows an example of a Web Service workflow in the health sector which may be executed by an example of a method for executing a workflow, when a patient is transferred to the cardiology department of a hospital. Depending on the diagnostic findings, either an in-patient treatment is applied or an electrocardiogram (ECG) is made in order to acquire further insight. Sub-activities of the workflow on the one hand represent practical activities that require human interaction like a medication. On the other hand, they stand for information processing tasks, like an update of the stock of pharmaceuticals in the database.

As the example further shows, sub-activities or tasks may be combined by sequence or switch operators. A sequence operator specifies that tasks are executed sequentially. Sequential execution in this context means in particular that both tasks are executed. The tasks will also be executed in a particular order. The switch operator, on the other hand, specifies that execution is based on a decision, wherein a specific branch of the workflow is chosen while the other branch is ignored. That is, only one branch will be executed.

Figure 2:
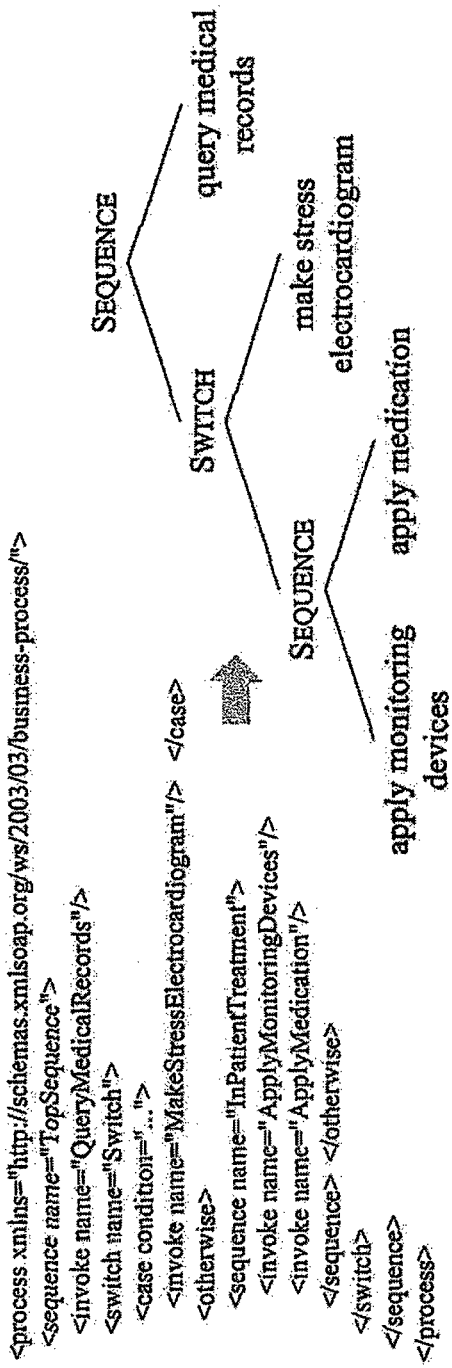
FIG. 2 shows a BPEL description of the workflow according to FIG. 1 and the resulting tree representation.

FIG. 2 shows a BPEL description of the workflow according to FIG. 1 and the resulting tree representation. As Web services are autonomous software components that can be integrated into varying workflows, access control of Web service workflows proceeds at the Web services' layer.

Web service workflows may be specified by use of BPEL4WS or similar workflow modeling languages such as ebXML BPSS or WSCL. It provides five control patterns, namely flow, while, sequence, switch, and pick. Since from an access control point of view it is only of importance, if all sub-activities of the workflow or only one of them will be performed, the control patterns are divided in two groups, represented by SEQUENCE (all sub-activities: flow, while, sequence) and SWITCH (one of the sub-activities: switch, pick), as shown on the right hand side of FIG. 2.

All sub-activities or tasks of the workflow define—a priori—their own security policies. Security policies are best specified and most flexible when using a set of well-defined formal rules. In one example, this definition by formal rules may be done in XACML ("eXtensible Access Control Mark-up Language"), defined by the OASIS Open consortium.

The workflow may comprise more than one individual Web Service. For these other Web Services, other security policies may apply. Therefore, in order to enforce these heterogeneous security policies when executing the entire workflow, individual security policies must—theoretically—be checked upon entry into every single task component of the workflow.

FIG. 3 shows an example of an XACML description of the individual security policy defined for the individual Web Service named 'query medical records'. The individual security policy expressed in the diagram states that all subjects having the role 'Physician' may carry out the action 'Select' on the resources specified as 'Medical Records'.

This security policy only applies to the individual Web Service named 'query medical records' forming part or being a component of a workflow.

For the whole of the sub-activities of the e-health workflow of FIG. 1, the following access rules are assumed:

1. Health personnel with permanent employment and administrative personnel are allowed to access the medical records of patients:

$S_{MR}=((\text{role} \supseteq \text{Health Pers.}\wedge\text{employment=permanent})\vee(\text{role} \supseteq \text{Admin.Pers.}))$ 2. Nurses of the cardiology and internists are allowed to update medical records, e.g., by inserting ECG results:

$S_{ECG}=((\text{role} \supseteq \text{Nurse}\wedge\text{field-of-activity=cardiology})\vee(\text{role} \supseteq \text{Internist}))$ 3. Internists are allowed to perform the sub-activity "apply monitoring devices":

$S_{App}=(\text{role} \supseteq \text{Internist})$

4. The sub-activity "apply medication" can be performed by nurses and physicians:

$S_{Med}=((\text{role} \supseteq \text{Nurse})\vee(\text{role} \supseteq \text{Physician}))$ In the above, $S_A$ specifies the set of roles authorised to execute the respective sub-application A and role$\supseteq$someRole specifies that the authorised executor of the workflow should own a role equal-or-senior to someRole. A limited hierarchy of roles that may be employed for specifying security policies and for inferring access rights based on inheritance is shown in FIG. 4. Access rights may be specified by requiring a minimal role a certain user has to fulfil. If the user owns a role which is specified as senior to the minimally required role, access may be granted as well.

In general, a consolidated access control configuration for the workflow may be inferred from a set of individual security policies through a bottom-up analysis. As, in BPEL-processes, no access control policies are defined for the control structures, the privileges defined for the individual Web services (defined in XACML) are iteratively aggregated.

The set of authorised users in the above example may be determined as follows:

First, $S_{App}$ and $S_{Med}$ are intersected as both sub-activities are linked in sequence. It holds $$S_{App} \wedge S_{Med} = (\text{role} \sqsupseteq \text{Internist}).$$

Next, the SWITCH node is evaluated. The subjects that are granted full-authorisation are defined by $$S = (\text{role} \sqsupseteq \text{Internist}).$$

In contrast to this, nurses are only granted partial authorisation for the ECG-branch:

$$S' = (\text{role} \sqsupseteq \text{Nurse} \wedge \text{field-of-activity} = \text{cardiology}).$$

Finally, S and S' have to be intersected with $S_{MR}$. This yields the following constraints:

$$S_{all} = (S_{MR} \wedge S) = (\text{role} \sqsupseteq \text{Internist} \wedge \text{employment} = \text{permanent})$$

$$S_{(ECG)} = (S_{MR} \wedge S') = (\text{role} \sqsupseteq \text{Nurse} \wedge \text{field-of-activity} = \text{cardiology} \wedge \text{employment} = \text{permanent})$$

Thus, the workflow is executable for nurses and internists, whereby nurses are only granted partial authorisation. A partial authorisation may be conceived as the right to access at least one, but not all branches of a workflow represented as a tree using SEQUENCE and SWITCH operators.

This allows the following optimisation of access control at the workflow layer: Internists that fulfil the specification of $S_{all}$ need only be authorised at the workflow layer. For nurses, access control has to be performed twice: On top of the workflow layer and when entering the SWITCH part.

All other subjects, like those granted the Administrative Personnel role, can be blocked right from the beginning, as they will never succeed in reaching an end state of the workflow. In practice, it may in other words be checked before executing the entire workflow whether the requesting user does at least possess a partial authorisation, i.e. the right to execute at least one branch. If this is not the case, the request may be rejected right away, thus preventing costly rollbacks. If a global authorisation exists, it only needs to be checked once before executing the workflow. If only a partial authorisation exists, it must be checked further down the tree, i.e. before entering a particular branch of a SWITCH node.

The optimisation capabilities can be realised to the maximum extent possible, if the access control of the sub-activities can be controlled by the composite application, for instance by building up a security context between the workflow execution system and the autonomous services.

In any case, policy enforcement at the workflow layer helps to reduce unnecessary service executions, transaction rollbacks or compensating actions.

Figure 5:
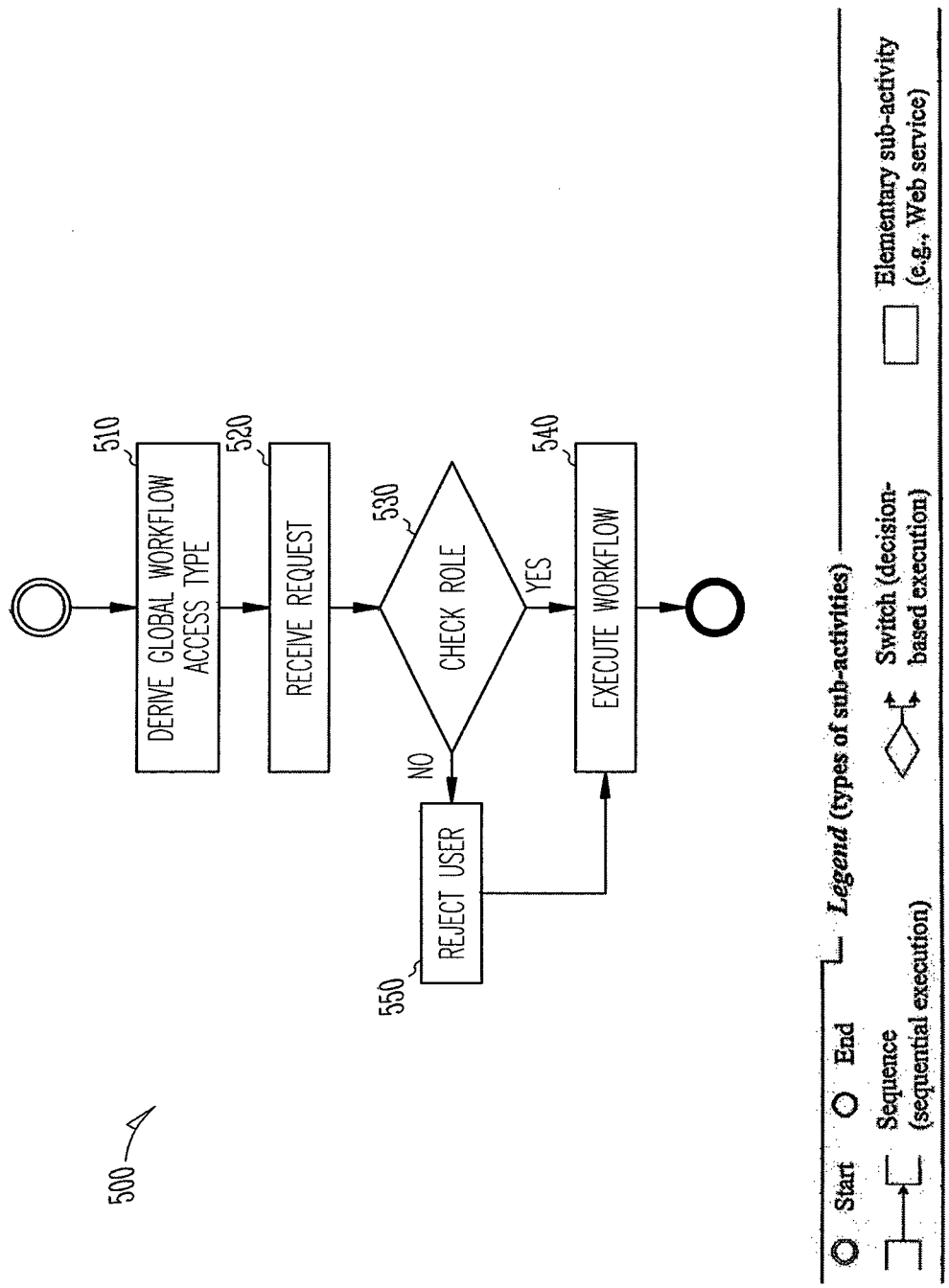
FIG. 5 shows a flowchart of an example of a method for executing a workflow.

FIG. 5 shows a flowchart of an example of a method for executing a workflow.

In operation 510, a global or partial access type is derived from a set of individual access constraints pertaining to component sub-activities of a particular workflow. The global or partial access type may be computed using the formalism described in relation to FIGS. 3 and 4.

In operation 520, a request to execute a workflow is received from a particular user. It is assumed that each user is associated with at least one role that is known to the system executing the now described method. In one example, this role may be looked up in a directory service.

In operation 530, global access control is performed based on the global access type derived in operation 510. That is, it is checked whether the user owns a role that is equal or senior to the role required by the global access type.

If access is allowable, then the method continues with operation 540 by executing the workflow. Otherwise, if access is not allowable, the user is rejected before executing the workflow in operation 550.

Even when it is possible to reject users before execution of an entire workflow that do not possess at least a partial authorisation, task-level security checks may not be given up entirely without compromising security. This is particularly due to the fact that partial authorisations must always be checked further down the tree, but also because sub-activities stand for themselves, i.e. in known systems they may usually be invoked arbitrarily, bypassing global workflow control. However, there still exist possibilities for optimisation, as will be discussed now.

Figure 6:
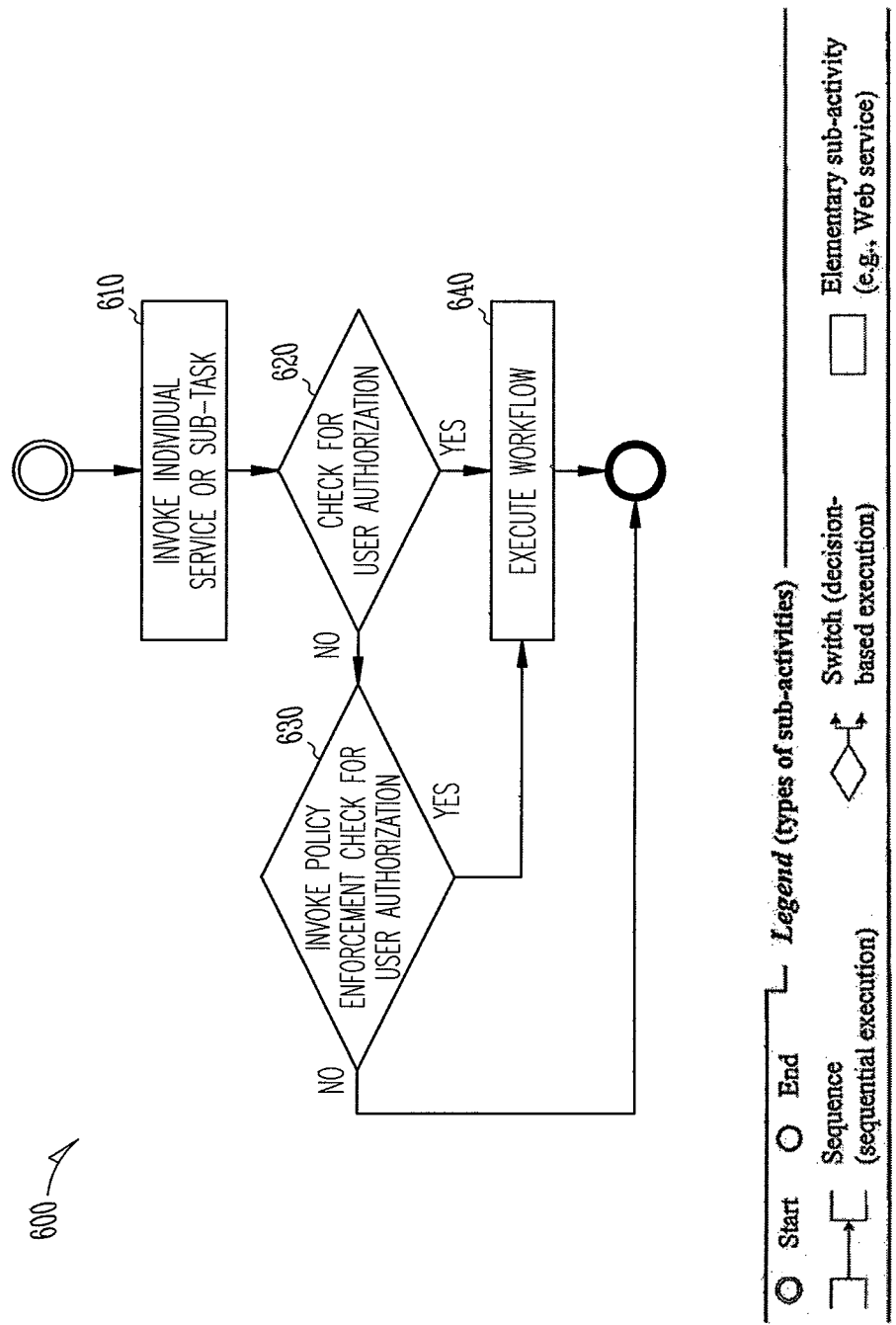
FIG. 6 is a flowchart showing how, in a further example, the individual tasks of a workflow are executed.

FIG. 6 is a flowchart showing how, in a further example, the individual tasks of a workflow are executed. It is assumed that global execution of the workflow has reached the stadium of operation 540, as shown in the example of FIG. 5. The individual service or sub-task is invoked in operation 610. Then it is checked in operation 620 whether the user requesting the execution of a particular sub-activity or task, as a component of a global workflow, possesses the relevant authorisation.

In the state of the art, existing checks on the task or sub-activity level involve costly invocations of a policy enforcement module. These invocations may be replaced by first extracting the access policy (specified in XACML) concerning a particular service, task or sub-activity and then replacing the (costly) invocation of the policy enforcement module with a more efficient direct check, using the extracted information.

In relation to the above example, wherein the internist owns a global authorisation to access the workflow, this direct check on the task level may be expressed in pseudo-code as follows:

If role=internist then service.call(param); else service.call_pep(role,param);

If the check is positive then the individual service is called in operation 640. In service call the service is invoked immediately with the parameters param, in service.call_pep there is a call to the policy enforcement point (PEP) first. The first check is less costly than the latter, thus resulting in an optimisation.

If the check in operation 620 is negative, then the policy enforcement point may be invoked in operation 630, which means that a further, now more costly check is performed whether the user fulfils the requirements of the security policy. If this is the case, the individual service may still be executed in operation 640. Otherwise, the execution of the workflow may stop or throw a violation of access rights exception.

The invention claimed is:

1. A computer-implemented method for executing a workflow, wherein the workflow comprises a set of individual activities, the individual activities executable according to alternative execution paths, each of the execution paths through the workflow comprising a plurality of tasks, each task having an associated access policy, the method comprising:

computing a global workflow access type and a partial workflow access type, wherein
the global workflow access type specifies a right to execute all of the individual activities belonging to the workflow, and
the partial workflow access type specifies a right to execute all tasks of a plurality of tasks of a particular path of the alternative execution paths in the workflow based on one or more access policies corresponding to the plurality of tasks, so that the workflow is executable along the particular path;
receiving a request from a user to execute the workflow;
executing an access control based on a workflow access type assigned to the user, wherein
if the user is assigned the global workflow access type, authorizing the user to execute all of the individual activities belonging to the workflow,
if the user is assigned the partial workflow access type, authorizing the user to access all tasks of a corresponding plurality of tasks of the particular path, and
if the user is not assigned the global workflow access type or the partial workflow access type, rejecting the user before executing the workflow.

2. The computer-implemented method of claim 1, wherein deriving the global workflow access type comprises the operations of:
determining, for each individual activity in the workflow, a set of individual access rules, and
inferring a consolidated access control by aggregating the individual access rules of a particular individual activity.

3. The computer-implemented method of claim 2, wherein the individual access rules are specified using eXtensible Access Control Markup (XACML).

4. The computer-implemented method of claim 2, wherein inferring the consolidated access control comprises intersecting individual access constraints, the individual access constraints linked in sequence and further comprises determining partial access constraints for at least a portion of the alternative execution paths in the workflow.

5. The computer-implemented method of claim 1, wherein an access policy is based on roles.

6. The computer-implemented method of claim 3, wherein inferring the consolidated access control comprises inferring a minimum role.

7. The computer-implemented method of claim 1, wherein the workflow is a web service workflow.

8. The computer-implemented method of claim 7, wherein the web service workflow is specified using Business Process Execution Language for Web Services (BPEL4WS).

9. The computer-implemented method of claim 1, wherein the individual activities belonging to the workflow are combined using control patterns, wherein the control patterns specify a cumulative (SEQUENCE) execution of the individual activities or alternative (SWITCH) execution of the individual activities.

10. The computer-implemented method of claim 9, wherein the control patterns that specify the cumulative execution of activities comprise the operators:
flow;
while; and
sequence.

11. The computer-implemented method of claim 9, wherein the control patterns that specify the alternative execution of activities comprise the operators:
switch; and
pick.

12. A system for executing a workflow wherein the workflow comprises a set of individual activities, the individual activities executable according to alternative execution paths, each of the execution paths through the workflow comprising a plurality of tasks, each task having an associated access policy, the system comprising
an access control module to compute a global workflow access type and a partial workflow access type, wherein
the global workflow access type specifies a right to execute all of the individual activities belonging to the workflow, and
the partial workflow access type specifies a right to execute all tasks of a plurality of tasks of a particular path of the alternative execution paths in the workflow based on one or more access policies corresponding to the plurality of tasks, so that the workflow is executable along the particular path;
an authorization module to receive a request from a user to execute the workflow;
and
a decision module, the decision module having one or more processors to execute instructions embodied on a non-transitory computer-readable medium, to execute an access control based on a workflow access type assigned to the user, wherein
if the user is assigned the global workflow access type, authorizing the user to execute all of the individual activities belonging to the workflow,
if the user is assigned the partial workflow access type, authorizing the user to access all tasks of a corresponding plurality of tasks of the particular path, and
if the user is not assigned the global workflow access type or the partial workflow access type, rejecting the user before executing the workflow.

13. A non-transitory computer-readable medium, comprising instructions that, when executed by a computer or computer network system, cause the computer or the computer network system to perform a method for executing a workflow, wherein the workflow comprises a set of individual activities, the individual activities executable according to alternative execution paths, each of the execution paths through the workflow comprising a plurality of tasks, each task having an associated access policy, the method comprising:
computing a global workflow access type and a partial workflow access type, wherein
the global workflow access type specifies a right to execute all of the individual activities belonging to the workflow, and
the partial workflow access type specifies a right to execute all tasks of a plurality of tasks of at least a particular path of the alternative execution paths in the workflow based on one or more access policies corresponding to the plurality of tasks, so that the workflow is executable along the particular path;
receiving a request from the user to execute the workflow;
executing an access control based on a workflow access type assigned to the user, wherein
if the user is assigned the global workflow access type, authorizing the user to execute all of the individual activities belonging to the workflow, and
if the user is assigned the partial workflow access type, authorizing the user to access all tasks of a corresponding plurality of tasks of the particular path, and
if the user is not assigned the global workflow access type or the partial workflow access type, rejecting the user before executing the workflow.

14. The computer-implemented method of claim 1, further comprising confirming the access type assigned to the user prior to executing a next activity of the individual activities belonging to the workflow according to the particular path.

* * * * *